US008665592B2

(12) United States Patent
Mowry et al.

(10) Patent No.: US 8,665,592 B2
(45) Date of Patent: Mar. 4, 2014

(54) HEAT MANAGEMENT USING POWER MANAGEMENT INFORMATION

(75) Inventors: Anthony C. Mowry, Buda, TX (US); David G. Farber, Austin, TX (US); Michael J. Austin, Austin, TX (US); John E. Moore, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/280,864

(22) Filed: Oct. 25, 2011

(65) Prior Publication Data

US 2012/0039041 A1 Feb. 16, 2012

Related U.S. Application Data

(63) Continuation of application No. 12/470,956, filed on May 22, 2009, now Pat. No. 8,064,197.

(51) Int. Cl.
*H05K 7/20* (2006.01)
*G06F 1/00* (2006.01)

(52) U.S. Cl.
USPC ............ 361/679.53; 361/679.46; 361/688; 361/689; 361/699; 361/719; 713/300; 713/320; 713/322; 700/300; 257/714; 165/80.3; 165/80.4; 165/80.5; 165/104.33; 702/130; 62/3.2; 62/259.2

(58) Field of Classification Search
USPC ............... 361/679.46–679.55, 690–697, 361/700–712, 715–727; 165/80.2–80.5, 165/104.33, 104.34, 121–126, 185; 62/259.2; 454/184; 257/714–727; 700/300, 320, 322, 323; 702/132, 188, 702/130; 712/43; 716/8, 9, 11, 10, 12, 13, 716/14, 16, 17; 710/261, 267, 264

See application file for complete search history.

(56) References Cited

U.S. PATENT DOCUMENTS

| | | | | |
|---|---|---|---|---|
| 4,779,161 A * | 10/1988 | DeShazo, Jr. | | 361/106 |
| 5,502,838 A * | 3/1996 | Kikinis | | 713/501 |
| 5,781,783 A * | 7/1998 | Gunther et al. | | 713/320 |
| 5,812,860 A | 9/1998 | Horden et al. | | |
| 5,902,044 A * | 5/1999 | Pricer et al. | | 374/112 |
| 5,915,232 A * | 6/1999 | McMinn | | 702/130 |
| 6,091,255 A * | 7/2000 | Godfrey | | 324/750.06 |
| 6,105,142 A * | 8/2000 | Goff et al. | | 713/324 |
| 6,115,763 A * | 9/2000 | Douskey et al. | | 710/72 |
| 6,141,762 A | 10/2000 | Nicol et al. | | |
| 6,216,235 B1 | 4/2001 | Thomas et al. | | |
| 6,219,742 B1 * | 4/2001 | Stanley | | 710/260 |
| 6,424,533 B1 | 7/2002 | Chu et al. | | |
| 6,442,700 B1 * | 8/2002 | Cooper | | 713/320 |
| 6,457,135 B1 * | 9/2002 | Cooper | | 713/323 |

(Continued)

OTHER PUBLICATIONS

Naveh, Alon, et al., "Power and Thermal Management in the Intel® Core™ Duo Processor," Intel Technology Journal, vol. 10, issue 02, May 15, 2006, pp. 109-122, URL: <http://developer.intel.com/technology/itj/index.htm>.

*Primary Examiner* — Michail V Datskovskiy
(74) *Attorney, Agent, or Firm* — Abel Law Group, LLP

(57) ABSTRACT

A multi-core microprocessor provides an indication of the power management state of each of the cores on output terminals. Cooling of the cores is adjusted responsive to the indication of the power management state of the respective cores with additional cooling being provided to those cores in a more active state and less cooling provided to those cores in a less active state.

16 Claims, 9 Drawing Sheets

(56) References Cited

U.S. PATENT DOCUMENTS

| | | | |
|---|---|---|---|
| 6,484,521 B2 | 11/2002 | Patel et al. | |
| 6,487,463 B1 * | 11/2002 | Stepp, III | 700/79 |
| 6,487,668 B2 | 11/2002 | Thomas et al. | |
| 6,534,995 B1 * | 3/2003 | Schell et al. | 324/511 |
| 6,595,014 B2 | 7/2003 | Malone et al. | |
| 6,612,120 B2 | 9/2003 | Patel et al. | |
| 6,614,109 B2 | 9/2003 | Cordes et al. | |
| 6,650,542 B1 | 11/2003 | Chrysler et al. | |
| 6,711,904 B1 * | 3/2004 | Law et al. | 62/3.2 |
| 6,718,474 B1 * | 4/2004 | Somers et al. | 713/322 |
| 6,786,639 B2 * | 9/2004 | Covi et al. | 374/178 |
| 6,795,927 B1 * | 9/2004 | Altmejd et al. | 713/300 |
| 6,804,632 B2 * | 10/2004 | Orenstien et al. | 702/188 |
| 6,817,196 B2 | 11/2004 | Malone et al. | |
| 6,825,557 B2 * | 11/2004 | DiBattista et al. | 257/712 |
| 6,836,849 B2 | 12/2004 | Brock et al. | |
| 6,845,456 B1 * | 1/2005 | Menezes et al. | 713/320 |
| 6,854,064 B2 * | 2/2005 | Ahn | 713/300 |
| 6,880,345 B1 | 4/2005 | Leija et al. | |
| 6,889,332 B2 * | 5/2005 | Helms et al. | 713/322 |
| 6,893,902 B2 | 5/2005 | Cordes et al. | |
| 6,908,227 B2 | 6/2005 | Rusu et al. | |
| 6,952,346 B2 | 10/2005 | Tilton et al. | |
| 6,988,534 B2 | 1/2006 | Kenny et al. | |
| 7,028,118 B2 | 4/2006 | Smith et al. | |
| 7,043,405 B2 | 5/2006 | Orenstien et al. | |
| 7,062,933 B2 | 6/2006 | Burns et al. | |
| 7,069,189 B2 * | 6/2006 | Rotem | 702/189 |
| 7,075,261 B2 | 7/2006 | Burstein | |
| 7,086,058 B2 * | 8/2006 | Luick | 718/102 |
| 7,089,430 B2 * | 8/2006 | Cooper | 713/300 |
| 7,111,178 B2 | 9/2006 | Rusu et al. | |
| 7,123,995 B1 * | 10/2006 | Desai et al. | 700/299 |
| 7,144,152 B2 * | 12/2006 | Rusu et al. | 374/141 |
| 7,149,645 B2 | 12/2006 | Mangrulkar et al. | |
| 7,191,349 B2 | 3/2007 | Kaushik et al. | |
| 7,197,733 B2 | 3/2007 | Issa et al. | |
| 7,249,268 B2 | 7/2007 | Bhandarkar | |
| 7,254,721 B1 * | 8/2007 | Tobias et al. | 713/300 |
| 7,263,457 B2 | 8/2007 | White et al. | |
| 7,275,012 B2 * | 9/2007 | Hermerding, II | 702/136 |
| 7,296,167 B1 | 11/2007 | Hughes | |
| 7,336,487 B1 | 2/2008 | Chrysler et al. | |
| 7,349,762 B2 | 3/2008 | Omizo et al. | |
| 7,369,404 B2 | 5/2008 | Han et al. | |
| 7,369,409 B2 | 5/2008 | Yazawa | |
| 7,395,174 B2 | 7/2008 | Aguilar et al. | |
| 7,421,601 B2 | 9/2008 | Bose et al. | |
| 7,424,630 B2 * | 9/2008 | Horvath | 713/300 |
| 7,426,649 B2 | 9/2008 | Brittain et al. | |
| 7,436,059 B1 | 10/2008 | Ouyang | |
| 7,451,332 B2 | 11/2008 | Culbert et al. | |
| 7,451,333 B2 | 11/2008 | Naveh et al. | |
| 7,460,369 B1 | 12/2008 | Blish, II | |
| 7,460,932 B2 * | 12/2008 | Johns et al. | 700/299 |
| 7,487,012 B2 * | 2/2009 | Bose et al. | 700/300 |
| 7,490,017 B2 | 2/2009 | Aguilar et al. | |
| 7,502,803 B2 * | 3/2009 | Culter et al. | 1/1 |
| 7,502,948 B2 | 3/2009 | Rotem et al. | |
| 7,512,530 B2 | 3/2009 | Aguilar et al. | |
| 7,519,925 B2 | 4/2009 | Issa et al. | |
| 7,523,617 B2 * | 4/2009 | Venkatasubramanian et al. | 62/3.7 |
| 7,549,177 B2 | 6/2009 | Diefenbaugh et al. | |
| 7,552,340 B2 | 6/2009 | Ooi et al. | |
| 7,568,115 B2 | 7/2009 | Borkar et al. | |
| 7,577,860 B2 | 8/2009 | Carpenter et al. | |
| 7,581,198 B2 | 8/2009 | Huynh et al. | |
| 7,584,369 B2 * | 9/2009 | Capps et al. | 713/300 |
| 7,596,430 B2 | 9/2009 | Aguilar et al. | |
| 7,596,705 B2 | 9/2009 | Kim | |
| 7,617,403 B2 | 11/2009 | Capps et al. | |
| 7,650,518 B2 * | 1/2010 | Allarey et al. | 713/300 |
| 7,650,521 B2 | 1/2010 | Oikawa | |
| 7,653,824 B2 | 1/2010 | Rangarajan et al. | |
| 7,664,971 B2 | 2/2010 | Oh | |
| 7,672,129 B1 | 3/2010 | Ouyang et al. | |
| 7,689,838 B2 * | 3/2010 | Srinivasan et al. | 713/300 |
| 7,690,214 B2 | 4/2010 | Lu et al. | |
| 7,702,938 B2 * | 4/2010 | Ha | 713/323 |
| 7,742,299 B2 | 6/2010 | Sauciuc et al. | |
| 7,757,233 B2 * | 7/2010 | Mukherjee | 718/100 |
| 7,774,626 B2 | 8/2010 | Fleming | |
| 7,778,519 B2 | 8/2010 | Harville | |
| 7,818,596 B2 | 10/2010 | Fenger et al. | |
| 7,865,751 B2 | 1/2011 | Monferrer et al. | |
| 7,870,893 B2 * | 1/2011 | Ouyang et al. | 165/288 |
| 7,875,986 B2 | 1/2011 | Isa et al. | |
| 7,878,016 B2 * | 2/2011 | Rotem et al. | 62/259.2 |
| 7,921,266 B2 * | 4/2011 | Rangarajan et al. | 711/158 |
| 7,949,887 B2 | 5/2011 | Gunther et al. | |
| 7,962,771 B2 * | 6/2011 | Song et al. | 713/300 |
| 7,966,506 B2 * | 6/2011 | Bodas et al. | 713/323 |
| 7,966,511 B2 | 6/2011 | Naveh et al. | |
| 8,028,181 B2 * | 9/2011 | Jahagirdar et al. | 713/320 |
| 8,032,772 B2 * | 10/2011 | Allarey et al. | 713/322 |
| 8,037,893 B2 * | 10/2011 | Aguilar et al. | 137/12 |
| 8,051,276 B2 * | 11/2011 | Krieger et al. | 712/220 |
| 8,055,822 B2 * | 11/2011 | Bernstein et al. | 710/65 |
| 8,069,358 B2 * | 11/2011 | Gunther et al. | 713/320 |
| 8,096,705 B2 * | 1/2012 | Sri-Jayantha et al. | 374/163 |
| 8,112,250 B2 * | 2/2012 | Floyd et al. | 702/182 |
| 8,112,647 B2 * | 2/2012 | Branover et al. | 713/320 |
| 8,135,559 B2 * | 3/2012 | Therien et al. | 702/130 |
| 8,169,764 B2 * | 5/2012 | Takayanagi et al. | 361/103 |
| 8,185,766 B2 * | 5/2012 | Barde | 713/324 |
| 8,214,660 B2 * | 7/2012 | Capps et al. | 713/300 |
| 8,235,593 B2 * | 8/2012 | Sri-Jayantha et al. | 374/166 |
| 8,239,699 B2 * | 8/2012 | Hsin et al. | 713/320 |
| 8,311,683 B2 * | 11/2012 | Angell et al. | 700/300 |
| 8,356,197 B2 * | 1/2013 | Allarey et al. | 713/322 |
| 8,515,590 B2 * | 8/2013 | Singh et al. | 700/300 |
| 2002/0104030 A1 * | 8/2002 | Ahn | 713/310 |
| 2003/0110012 A1 | 6/2003 | Orenstien et al. | |
| 2003/0229662 A1 * | 12/2003 | Luick | 709/106 |
| 2004/0107374 A1 * | 6/2004 | Cooper et al. | 713/320 |
| 2004/0182088 A1 * | 9/2004 | Ghoshal et al. | 62/3.7 |
| 2005/0050373 A1 | 3/2005 | Orenstien et al. | |
| 2005/0210905 A1 * | 9/2005 | Burns et al. | 62/259.2 |
| 2006/0022710 A1 | 2/2006 | Chalopin et al. | |
| 2006/0026447 A1 * | 2/2006 | Naveh et al. | 713/322 |
| 2006/0086118 A1 * | 4/2006 | Venkatasubramanian et al. | 62/259.2 |
| 2006/0090161 A1 | 4/2006 | Bodas et al. | |
| 2006/0095911 A1 | 5/2006 | Uemura et al. | |
| 2006/0095913 A1 | 5/2006 | Bodas et al. | |
| 2006/0149974 A1 | 7/2006 | Rotem et al. | |
| 2006/0156117 A1 | 7/2006 | Maruyama | |
| 2006/0161373 A1 * | 7/2006 | Mangrulkar et al. | 702/130 |
| 2006/0161375 A1 | 7/2006 | Duberstein et al. | |
| 2006/0218424 A1 | 9/2006 | Abramovici et al. | |
| 2006/0265174 A1 | 11/2006 | Doyle et al. | |
| 2006/0288243 A1 | 12/2006 | Kim | |
| 2007/0150759 A1 * | 6/2007 | Srinivasan et al. | 713/300 |
| 2007/0162776 A1 * | 7/2007 | Carpenter et al. | 713/320 |
| 2007/0198863 A1 * | 8/2007 | Bose et al. | 713/300 |
| 2007/0213882 A1 | 9/2007 | Inukai et al. | |
| 2007/0235180 A1 * | 10/2007 | Ouyang et al. | 165/287 |
| 2007/0260895 A1 * | 11/2007 | Aguilar et al. | 713/300 |
| 2007/0296475 A1 | 12/2007 | Oikawa | |
| 2008/0005591 A1 | 1/2008 | Trautman et al. | |
| 2008/0011467 A1 * | 1/2008 | Rodarte et al. | 165/287 |
| 2008/0028236 A1 | 1/2008 | Capps et al. | |
| 2008/0028244 A1 | 1/2008 | Capps et al. | |
| 2008/0034232 A1 * | 2/2008 | Rangarajan et al. | 713/300 |
| 2008/0104425 A1 * | 5/2008 | Gunther et al. | 713/300 |
| 2008/0148027 A1 * | 6/2008 | Fenger et al. | 712/229 |
| 2008/0189569 A1 * | 8/2008 | Chu | 713/600 |
| 2008/0281476 A1 * | 11/2008 | Bose et al. | 700/300 |
| 2008/0310099 A1 | 12/2008 | Monferrer et al. | |
| 2009/0072885 A1 | 3/2009 | Kawasaki | |
| 2009/0138748 A1 | 5/2009 | Kim et al. | |
| 2009/0153109 A1 | 6/2009 | Koertzen et al. | |
| 2009/0158067 A1 * | 6/2009 | Bodas et al. | 713/323 |

(56) References Cited

U.S. PATENT DOCUMENTS

| | | |
|---|---|---|
| 2009/0172375 A1* | 7/2009 | Rotem et al. .................. 713/1 |
| 2009/0172423 A1* | 7/2009 | Song et al. ................... 713/300 |
| 2009/0222654 A1* | 9/2009 | Hum et al. ................... 713/100 |
| 2009/0235105 A1 | 9/2009 | Branover et al. |
| 2009/0271646 A1 | 10/2009 | Talwar et al. |
| 2009/0288092 A1 | 11/2009 | Yamaoka |
| 2010/0031073 A1 | 2/2010 | Yeh et al. |
| 2010/0058078 A1 | 3/2010 | Branover et al. |
| 2010/0058086 A1 | 3/2010 | Lee |
| 2010/0064162 A1 | 3/2010 | Rotem et al. |
| 2010/0073068 A1 | 3/2010 | Cho et al. |
| 2010/0115343 A1* | 5/2010 | Floyd et al. .................... 714/39 |
| 2010/0169609 A1 | 7/2010 | Finkelstein et al. |
| 2010/0245179 A1 | 9/2010 | Puzella et al. |
| 2010/0324750 A1* | 12/2010 | Gaskins et al. ............... 700/299 |
| 2011/0099397 A1* | 4/2011 | Rotem et al. .................. 713/320 |
| 2011/0191607 A1* | 8/2011 | Gunther et al. ............... 713/300 |
| 2012/0201004 A1* | 8/2012 | Hamann et al. ............... 361/696 |
| 2013/0036317 A1* | 2/2013 | Naveh et al. .................. 713/320 |
| 2013/0185579 A1* | 7/2013 | Monferrer et al. ............ 713/323 |

* cited by examiner

HEAT MANAGEMENT USING POWER MANAGEMENT INFORMATION

CROSS-REFERENCE TO RELATED APPLICATION(S)

This application is a continuation of U.S. patent application Ser. No. 12/470,956, filed May 22, 2009, the disclosure of which is hereby incorporated herein by reference in its entirety for all purposes.

BACKGROUND

1. Field of the Invention

This invention relates to cooling control in multi-core computer systems and more particularly to cooling based on power state of the cores.

2. Description of the Related Art

In computer systems, cooling devices such as a fan are used to cool the microprocessor during operation by blowing air over a heatsink thermally coupled to the processor integrated circuit, thereby removing heat. Currently thermal energy removal devices are typically monolithic in design, meaning that the devices cover the entire processor package with no consideration for the number of cores that exist in the die below or their operating condition.

SUMMARY

In order to provide improved cooling management, in one embodiment, a computer system is provided that includes a microprocessor integrated circuit that includes a plurality of cores. The microprocessor integrated circuit also includes one or more output terminals that provide an indication of the power management state of each of the regions. The regions may be, e.g., processor cores. In an embodiment, a plurality of groups of output signals are provided with each group of output signals corresponding to one of the cores or a group of cores. Thus, for example, two output signals may be provided for each core to provide the power state of the cores. In other embodiments, a serial communications interface is provided over which the power state of the cores is provided.

In an embodiment, the computer system includes a thermal energy removal system, such as heatsinks and fans, liquid cooling, or Peltier devices, responsive to the indications of the power management state of the regions to provide additional thermal energy removal capability for those of the one or more regions indicated as being in a more active power management state as compared to other one or more regions indicated as being in a less active power management state.

In another embodiment, a method is provided that includes providing at a one or more output terminals of a microprocessor integrated circuit an indication of a power management state of each of respective processor cores on the integrated circuit; and adjusting cooling of at least one of the respective processor cores to have a different cooling as compared to cooling of other ones of the cores responsive to the indication of the power management state of the respective cores.

DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Multi-core processors have become common in the industry. Power management systems are evolving to control the multiple cores to provide power savings, by, e.g., reducing the clock frequency and/or the voltage supplied to one or more cores independently. Thus, individual cores (or groups of cores) can be shut down, or have their power reduced through reduced clock frequency and voltage. However, shutting down one or more cores while additionally loading other of the cores creates an imbalance in the distribution of thermal energy across the die. In other words, large thermal gradients appear across the die where two cores are running at voltages up to, e.g., 500 mV higher than nominal voltage, while two other cores are producing virtually no thermal energy at all.

Many computer systems are compliant with the Advanced Configuration and Power Interface (ACPI) specification. The ACPI specification describes processor core power states to be one of C1-Cn. The greater the index n, the deeper the power state and the smaller the consumed power. Other systems may operate in accordance with different power state protocols. For convenience, generic power state designations P0 to Pn will be used herein with the greater the index n, the deeper the power state. Current designs utilize a total dynamic power (TDP) budget for the processor. As one or more cores are throttled back, or turned off, a portion of their power budget can be allocated to other active cores to provide greater processing power to the active cores while staying within the TDP budget.

Figure 1A:
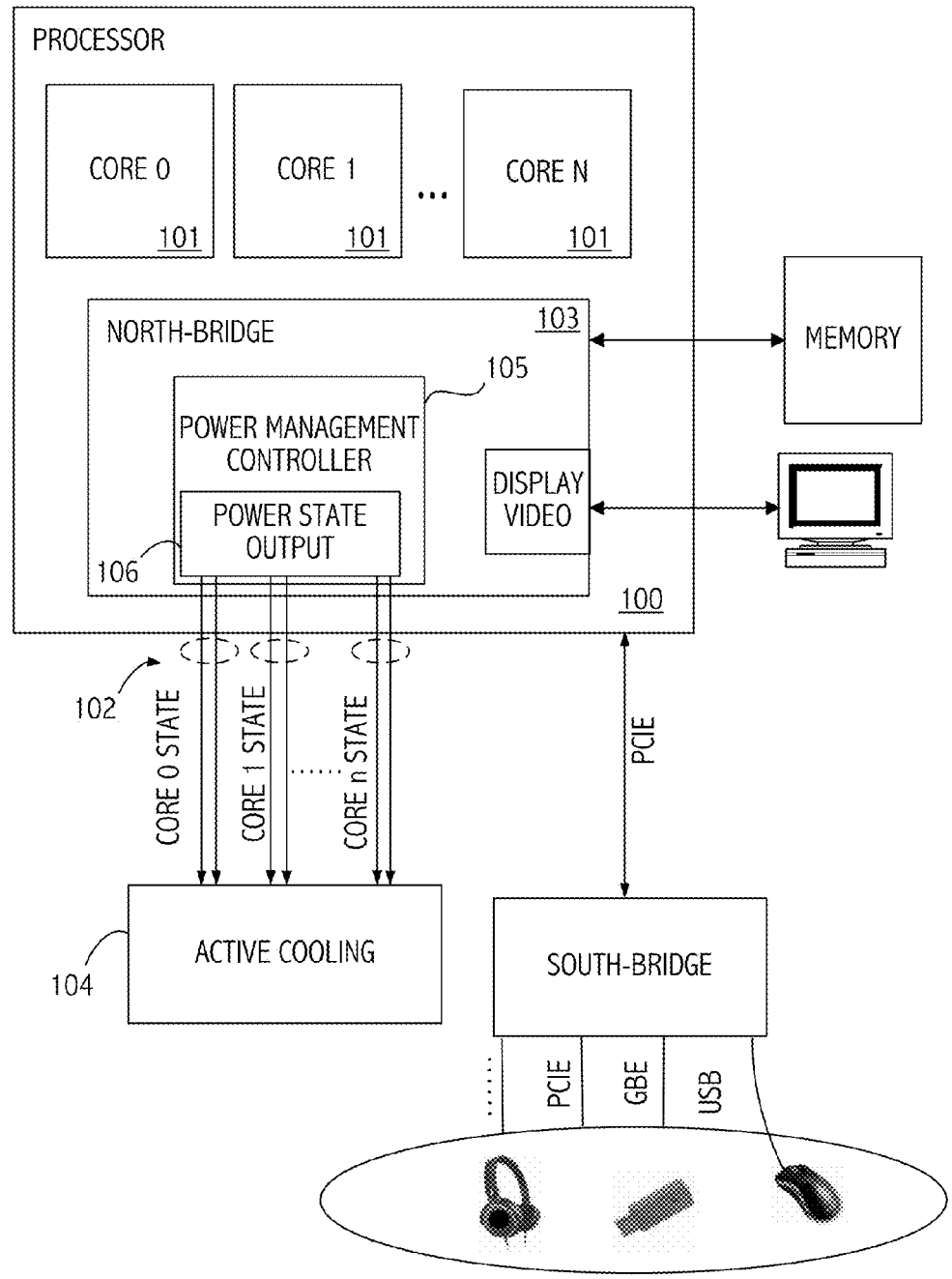
FIG. 1A shows a high level block diagram of a computer system incorporating an embodiment of the invention.

Various embodiments described herein capitalize on the advances in power management capability to control cores. FIG. 1A shows an exemplary high level block diagram of a computer system incorporating an embodiment of the invention. The computer system includes a processor 100 having multiple processing cores 101. The processor 100 further includes a North-Bridge 103 that includes a power management controller 105. The power management controller includes an output circuit 106 that signals to the external world which cores are active by signaling what power state they are in on power state signal lines 102, which are supplied to active cooling elements 104 (or their control logic). An exemplary circuit 106 produces a readout of the power state for each core with some level of basic granularity. For example, two output signals per core can be used to indicate that core 0 is in the off state (no thermal energy), the P0 (maximum heat production), and so forth. Table 1 shows an exemplary mapping of the power state output signals to the power states. Other numbers of power state signals besides two can of course be utilized and a different protocol may be utilized to communicate the information from the power management controller 105. For example, in some embodiments, cores may be grouped together in terms of power states. Thus, in a sixteen core embodiment, four cores may be tied together in the same power state. In such a case, only two signal lines (or the appropriate number to convey the power state information) need be utilized for the group of four.

TABLE 1

| Power State 0 | Power State 1 | Core power state |
|---|---|---|
| 0 | 0 | Core off |
| 0 | 1 | Core in P0 |
| 1 | 0 | Core in P2 |
| 1 | 1 | Core in P4 |

Figure 1B:
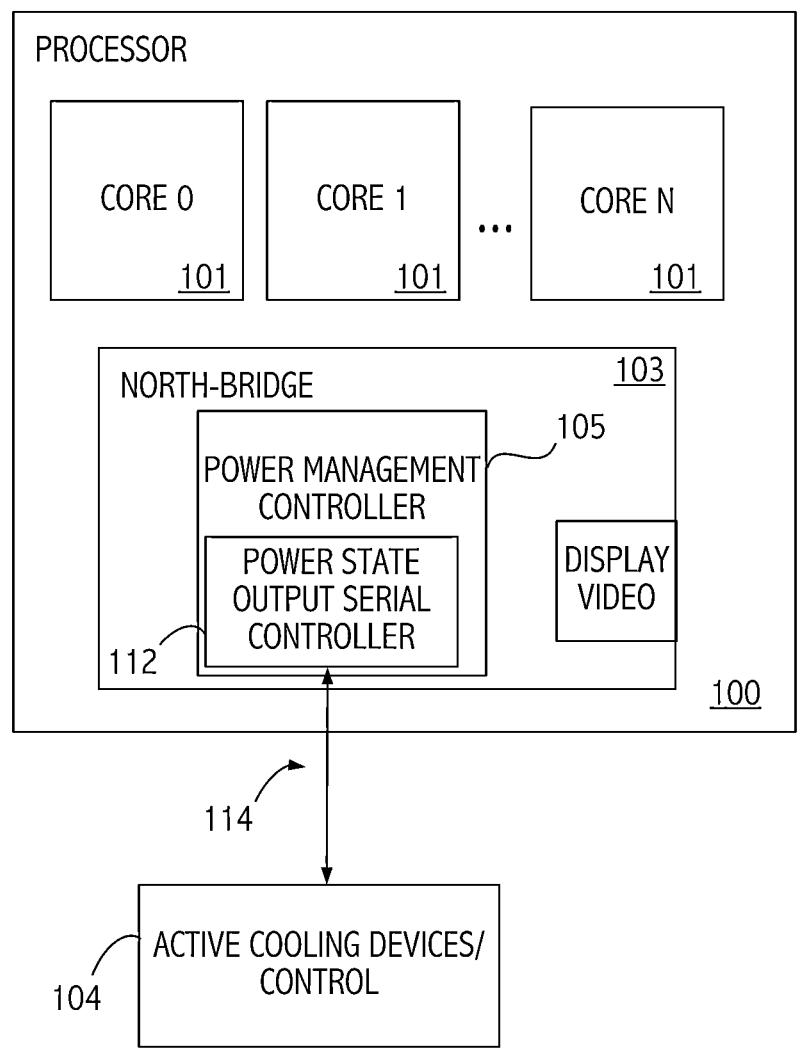
FIG. 1B shows a high level block diagram of a computer system incorporating an embodiment of the invention utilizing a serial communication link to transmit power state information of the cores.

Rather than use dedicated signal lines to provide core power states, a bus type protocol may be used. Thus, for example, in some embodiments a serial communications interface provides the power states of the cores. Referring to FIG. 1B, an exemplary embodiment is shown that uses a serial communications link to provide core power states. The power management controller 105 includes a power state output serial controller 112 that provides the power states for the various cores over a serial communications link 114 to the active cooling devices 104 and/or their control logic. The serial communications link can be any of a wide variety of well known serial links such as I²C, synchronous serial controllers (SSC), or simple serial interface (SSI). Even single wire serial communication protocols are known. Each of the cooling devices may have a unique address on the serial bus or a common controller may receive the power states of the various cores and control the cooling devices appropriately. Whether provided through dedicated signal lines or a bus, the heat management system can decide how to direct its thermal cooling budget based on the power state indications provided from the power management logic 105.

Figure 1C:
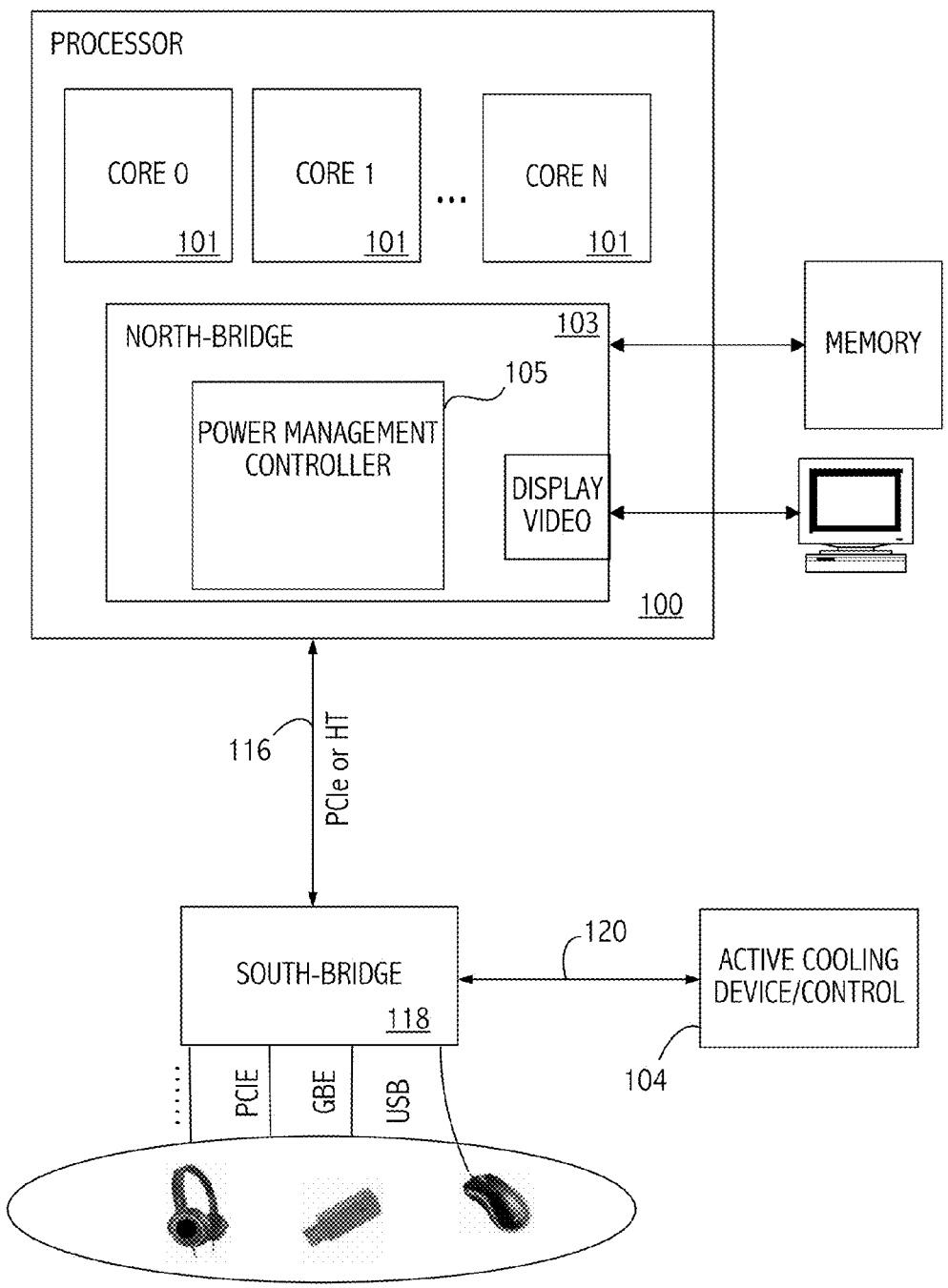
FIG. 1C shows a high level block diagram of a computer system incorporating an embodiment of the invention utilizing a communication link to transmit power state information of the cores to a South-Bridge.

In still other embodiments, the power states may be provided over an existing communication link on the processor integrated circuit such as a PCIe™ link or the HyperTransport™ (HT) link 116 (FIG. 2), as shown, e.g., in FIG. 1C. In an exemplary embodiment, the power management controller 105 provides the power states to the South-Bridge 118 over the PCIe or HT link 116. The South-Bridge 118 typically functions as an input/output hub, and in the embodiment shown in FIG. 1C has dedicated signal lines or a serial communications link 120 to control the active cooling devices 104.

Providing the power state indications from the power management logic 105, e.g., on signal lines 102 or serial interface lines 114 or through an appropriate communications interface, allows for the shifting of thermal cooling resources to focus on those cores that are more active. For example, assume a four core processor and two cores have been put in a power savings state that generates little or no power consumption. Assume the other two cores have had power budget shifted to them so that the two active cores are now producing a TDP equal to what is expected when all four cores are active with nominal voltages and clock frequencies. System resources previously used to cool the inactive cores can be shifted to cool the active cores. Capitalizing on signaling indicating the power state of the cores can improve the removal of heat by focusing on the active cores rather than the entire die. By focusing the heat removal capabilities of the heat sink on the hot spots created by having some cores active and some not, can result in greater efficiency and/or less power draw by the cooling system. Further, even greater benefits may be provided by using more advanced forms of cooling, such as heat pipes and water cooling, by allowing specific increases in cooling to address the temperature delta.

Figure 2A:
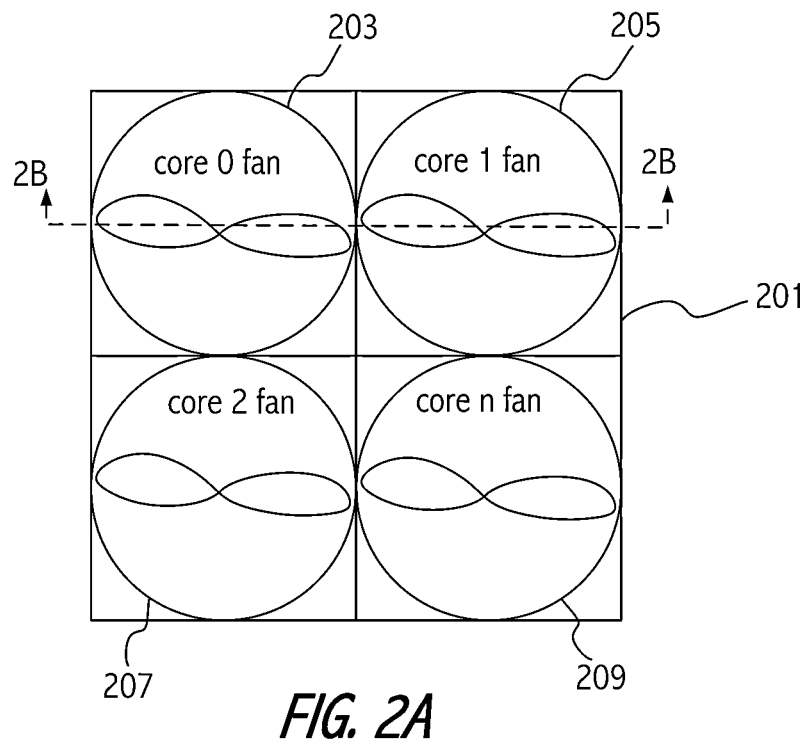
FIG. 2A shows an embodiment of a heatsink delineated into four regions with four fans.
Figure 2B:
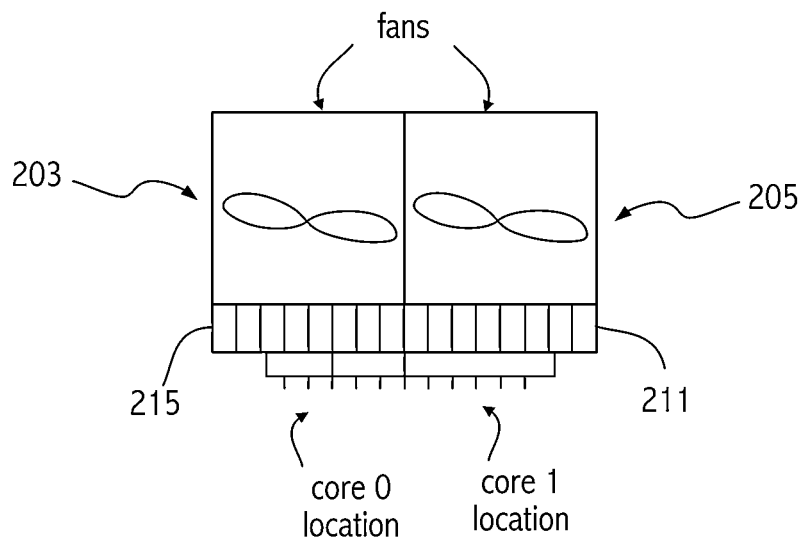
FIG. 2B shows a slice through FIG. 2A showing the integrated circuit die over which the thermal transfer array and fans are disposed.

Referring to FIG. 2A, one embodiment of the invention includes a heatsink 201 delineated into four regions with four fans 203, 205, 207, and 209 over a four core die with each fan corresponding to one of the dice. When some of the cores 101 (FIG. 1) are active and some are not, the power state indications from the processor help to address the thermal gradients by transferring cooling power to the portion of the die that is producing the most heat and therefore more effectively removing the heat. The cooling power is transferred by varying the rotational speed of the fans according to the power state indications provided by the processor, as described in relation to FIGS. 1A to 1C, to increase efficiency in heat removal per watt of cooling. Even greater gains in efficiency are achieved with a larger die having even more cores than the four shown in FIG. 2A, over the canonical single fan/heatsink combination over a multi-core die. FIG. 2B shows a slice through FIG. 2A showing the integrated circuit die 211 over which the thermal transfer array 215 portion of heatsink 201 is thermally coupled.

Figure 3A:
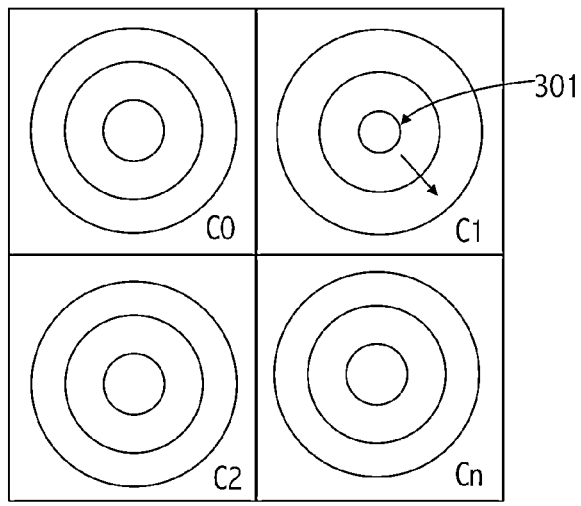
FIG. 3A shows exemplary thermal gradients associated with a multi-core processor with all cores operating in the same power state.
Figure 3B:
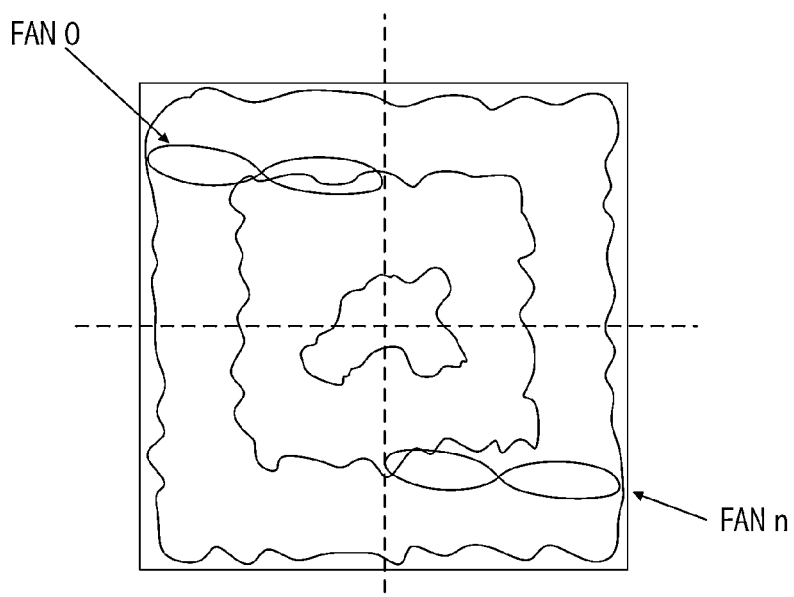
FIG. 3B shows how the heat spreads across the entire die with all cores operating in the same power state.
Figure 3C:
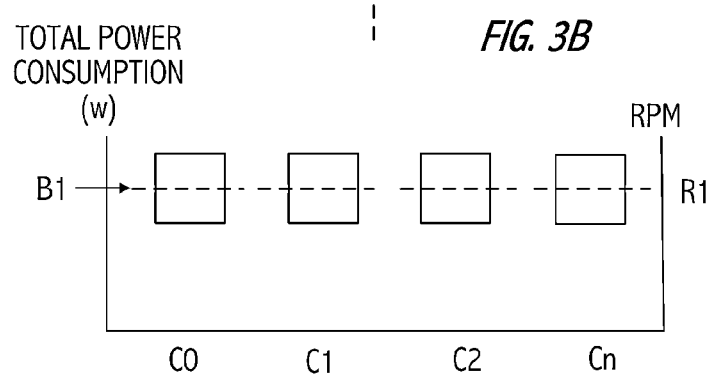
FIG. 3C shows fan speed versus total power consumption for the case shown in FIG. 3A.

Referring to FIGS. 3A, 3B, 3C, 4A, 4B, and 4C, the benefits of controlling cooling according to core power state is illustrated. First, referring to FIG. 3A, all cores are assumed to operate at the same operating point, e.g., a power state of P2, with the same voltage (V)=X and clock frequency=f1. All the core regions in FIG. 3A are shown to have approximately the same thermal gradients with a hot spot in the center e.g., at 301, and decreasing temperature towards the periphery of the core indicated by the concentric circles and arrow in core C1. As shown in FIG. 3B, with all cores operating and creating heat, the heat spreads across the entire die and all fans are operated to control the thermal energy being produced by the processor. Since all cores are more or less producing the same amount of heat in the same power state, the fans operate at the same rotational speed R1, and together draw an amount of power B1 at that speed. As shown in FIG. 3C, which shows fan speed versus power consumption, with total power on the left axis and RPM on the right axis, with each fan operating at RPM R1, the total power consumed by the four fans is B1.

In circumstances in which some of the cores are operating at a more active power state and some at a lower power state, the overall gradient is no longer spread across the die equally. For example, referring to FIG. 4A, again showing thermal gradients for the four cores, assume two cores C1 and C2 are in a lower power state, as shown by their thermal gradients, than the two cores C0 and Cn, which are operating in the P0 state and producing a high amount of heat. Assume that the cores C0 and Cn are operating at a voltage V=y, (y>x) and a clock frequency f2, f2>f1. As can be seen in FIG. 4B, the overall gradient is no longer spread across the die equally. Therefore, it makes more sense to run some of the fans at reduced speed and power and shift some speed and power to the fans that are over the cores C0 and Cn to increase heat removal from those locations, while trying to keep the power drawn by the cooling solution the same overall as in FIG. 3A. In FIG. 4C, the fans for cores C1 and C2 operate at RPM R0 with R0<R1. The fans for cores C0 and Cn are operating RPM R2 with R2>R1. The total power consumption of the fans is B2. FIG. 4C also shows the example of FIG. 3C for ease of comparison. For some systems, the reduction in power from the reduced RPMs of C1 and C2 is exactly offset by the increase in power from the increased RPMs of C0 and Cn, resulting in B1=B2. In other systems, B1 may be less or more than B2. In any case, the ability to draw more heat from the more active cores because of increased thermal removal capability directed to the two more active cores, allows the active cores to be more heavily loaded by increasing their voltage and/or frequency above what would have otherwise been possible without providing the increased cooling. Thus, increased processing capability can be provided to the system within the same TDP budget.

Therefore, in much the same way as power management techniques balance processing speed against a TDP budget, so the invention balances cooling capacity and power draw required by the cooling components. This is achieved though throttling fans that would be running over cool spots of the die and drawing power away from the throttled fans that could be better used by the fans over the active processors.

Figure 4A:
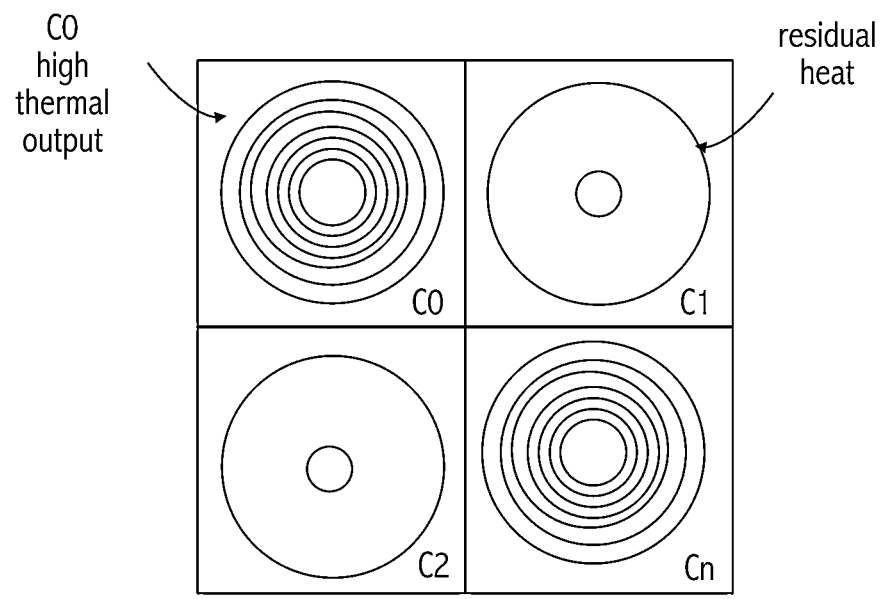
FIG. 4A shows exemplary thermal gradients associated with a multi-core processor with cores operating in different power states.
Figure 4B:
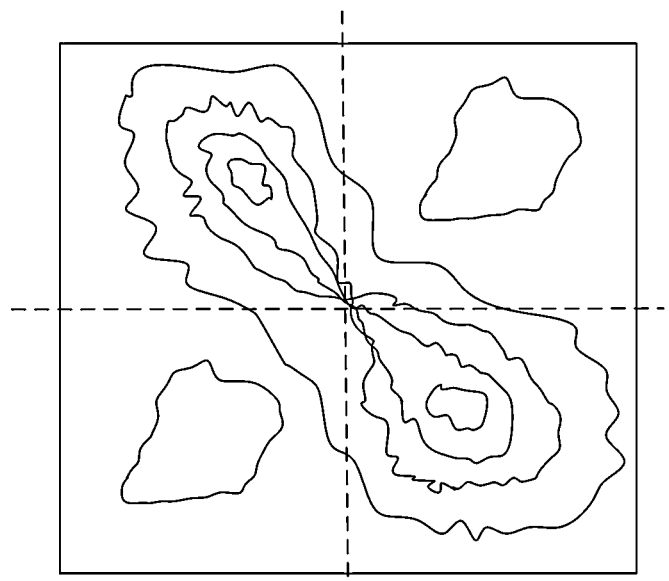
FIG. 4B shows how the heat spreads unevenly across the entire die with the cores operating in different power states.
Figure 4C:
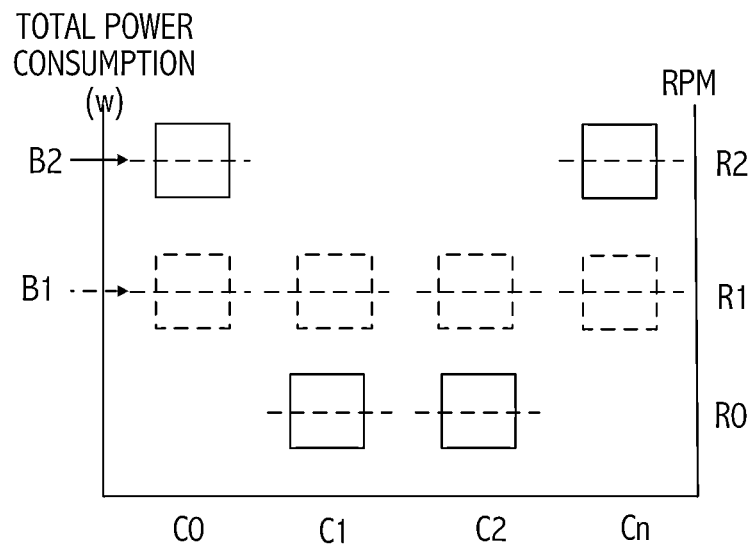
FIG. 4C shows fan speed versus total power consumption for the case shown in FIG. 4A.
Figure 5:
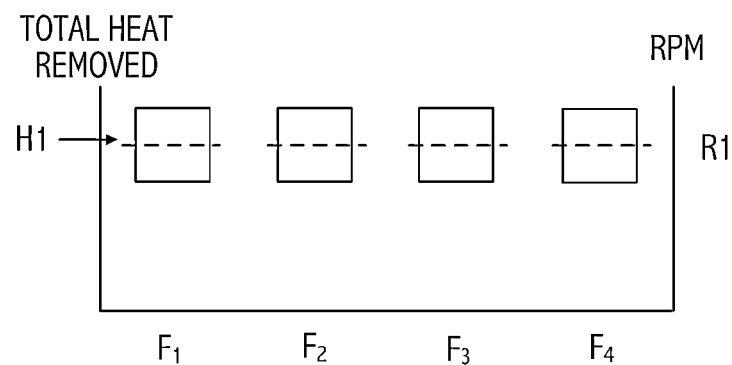
FIG. 5 illustrates heat removed from the system of FIG. 5A.
Figure 5:
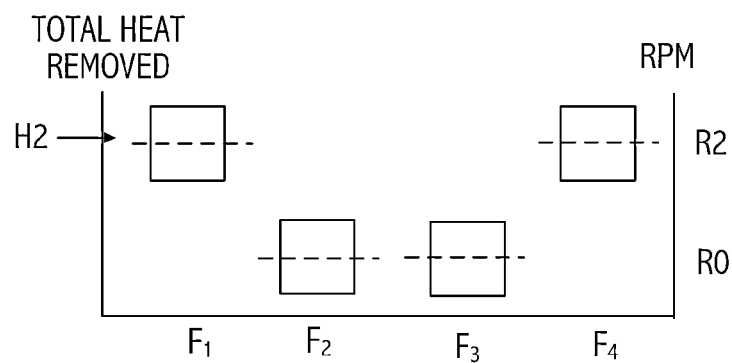

FIG. 5 shows heat removed for the two cases of FIGS. 3 and 4. The top portion of FIG. 5 shows the heat removed with four fans operating at the same speed for four cores operating at the same power state. The bottom portion shows the heat removed for the case of FIG. 4, with fans F1 and F4 operating at different speeds for cores C0 and Cn operating at the higher power state. In such a case, the amount of heat removed (H2), with the fans operating at different speeds, can be greater than the amount of heat removed (H1), with the four fans operating at the same speed, while still operating within the same cooling system power budget. Thus, better cooling for the die can be provided without increasing power unnecessarily. Comparing a monolithic design with all fans in lockstep, in order to match the same rate of heat removal as the embodiment shown in FIGS. 4A-4C, a monolithic design would require all fans to run at speed R2 and draw an amount of power>B1.

The higher removal of thermal energy also opens up the ability to place parts into a TDP combination through derating based on the increased thermal removal capability of the invention. Various embodiments of the invention include dies with multiple cores such as a 12 or 16 or more. In such a case, the benefits of throttling down the active cooling above the throttled cores would save more power than the four core example while providing equal cooling for the non-throttled cores. The number of active cooling elements can be tailored to the particular system requirements, considering such factors as energy use, fan size, cooling capability, number of cores, and efficiency.

Figure 6:
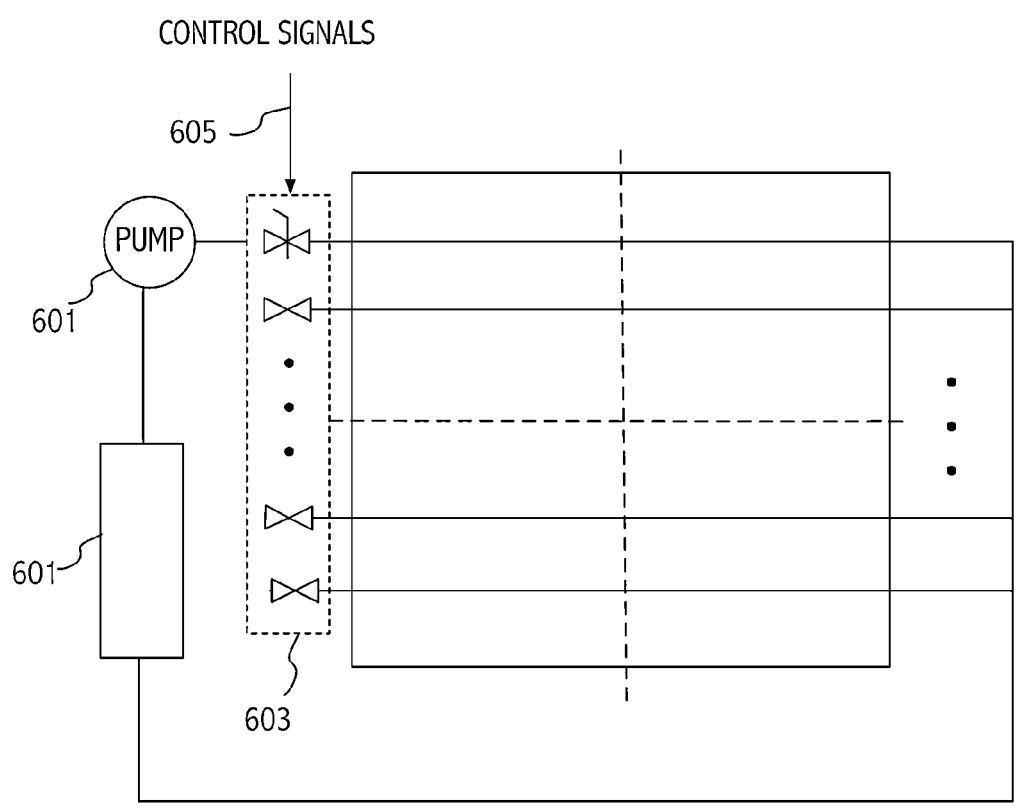
FIG. 6 illustrates an embodiment of the invention utilizing liquid cooling.

While embodiments utilizing fans has been described, other embodiments include other types of active cooling. For example, FIG. 6 illustrates a high level block diagram of a liquid cooling embodiment in which pumps are controlled to direct cooling liquid at a higher rate to areas with higher heat and to shut off or lower cooling liquid flow to areas of low heat generation. Liquid flows from reservoir 601 through pump 602 and into an array of controllable valves 603, across the die with a return flow to reservoir 601. Control signals 605, corresponding to the power state indications, can be used to directly control individual valves. The valves can provide variable flow based on the control signals. Thus, a higher flow rate is provided in a higher power state and a lower flow rate in lower power states. The flow may even be turned off when corresponding cores are in a deep power state and producing little thermal energy. In an embodiment, individual, or groups of valves are used to cool a particular die. That valve (or group of valves) is coupled to be controlled by the power state indication corresponding to a core cooled by the valve. The control signal(s) control a to provide maximum flow of cooling liquid when a core is in the P0 state and reduced flow in other less active power states (or no flow in deep power states). Thus, the valves are controlled in a similar manner to the fans described in relation to FIG. 4A. Such a cooling system ensures that the cooling medium is always being sent to the areas of the die (or dice) with the highest temperature delta and helps ensure that heat removal is the most efficient. Again, the higher rate of heat removal from the more active cores allows those active cores to be pushed farther into the TDP window through adjusted duration, taking into account the increased thermal dissipation provided by the invention in the P0 state while keeping power consumption to a minimum or at least at the same level as in the P2 state. In other embodiments, multiple pumps are provided with each of the pumps configured to cool one or more cores. Similar to the embodiment shown in FIG. 6, the control signals control each pump output based on the power state of a respective core in order to provide heat removal capability corresponding to the power state of the core.

Figure 7:
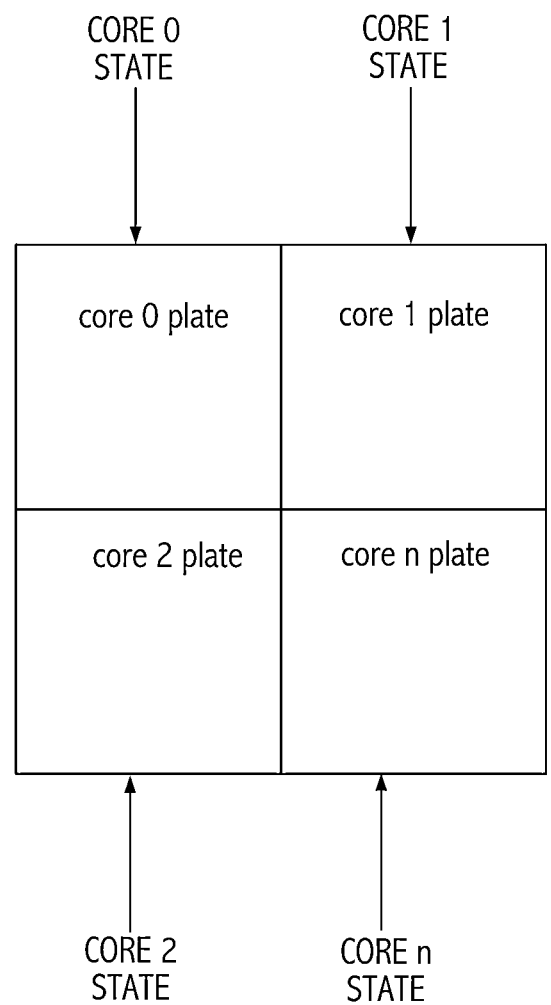
FIG. 7 illustrates an embodiment of the invention utilizing Peltier cooling.

In another embodiment, with reference to FIG. 7, the fans are replaced by Peltier devices (cooling plates), which cover each core and cool as needed in response to the core power state indications which are supplied to control the cooling plates. Power is saved by cooling cores in accordance with their power state indications. Note that Peltier devices remove heat in proportion to the amount of current utilized. Therefore, the power state indications can be directly used to increase or decrease the current to increase or decrease the cooling capability of the devices.

Various embodiments of the invention allow customized solutions to cooling that can reduce power draw while providing improved heat removal for computer systems. Battery life improvements can be realized in the multi-core mobile environment. Active cooling power consumption in the high power draw server space can be reduced in larger processor configurations where scaling increases the benefit of cooling according to power state. Matching active cooling power draw to the cores as necessary also increases the efficiency of the system as a whole.

While the regions being separately cooled have been described in various embodiments above as processing cores, in fact there are potentially multiple different compute units on processor integrated circuits that may be separately controlled for both power management and cooling purposes. Thus, e.g., an individual compute unit, such as a processing core, a graphics processing unit (GPU), a memory controller, an I/O controller, etc., may potentially be an individual region for the sake of thermal analysis/control. Thus, e.g., if the compute unit has its own distinct instruction pipeline, it will produce varying amounts of heat dependent on its instruction workload even if it shares a clock or voltage with other compute units, but especially so if it does not. Thus, cooling various regions of a processor integrated circuit typically includes separately cooling one or groups of cores according to their power management state, but may include other types of regions on the integrated circuit.

Thus, various embodiments have been described. Note that the description of the invention set forth herein is illustrative, and is not intended to limit the scope of the invention as set forth in the following claims. Variations and modifications of the embodiments disclosed herein may be made based on the description set forth herein, without departing from the scope of the invention as set forth in the following claims.

What is claimed is:

1. A method comprising:
   providing at one or more output terminals of an integrated circuit power management state indications of respective regions of the integrated circuit, the power management state indications being states associated with a power management protocol used by the integrated circuit; and
   in response to a change in one or more of the power management state indications, adjusting cooling of at least one of a plurality of thermal energy removal systems respective associated with one of the respective regions, the adjusting causing at least one of the respective regions to have different cooling than another of the respective regions.

2. The method as recited in claim 1 wherein the power management state indications are Advanced Configuration and Power Interface (ACPI) power states.

3. The method as recited in claim 1 wherein the power management state indications do not include temperature, voltage, or frequency measurements.

4. The method as recited in claim 1 further comprising:
   determining a thermal cooling budget associated with the respective regions; and
   based on the power management state indications, allocating the thermal cooling budget between the respective regions.

5. The method as recited in claim 4 wherein allocating the thermal cooling budget includes reallocating a portion of the thermal cooling budget from a first region of the respective regions to a second region of the respective regions.

6. An apparatus comprising:
   an integrated circuit including multiple regions; and
   a plurality of sets of one or more output terminals of the integrated circuit, wherein the integrated circuit is configured to provide at respective ones of the plurality of sets of one or more output terminals respective power management state indications, each of the power management state indications corresponding to a respective one of the multiple regions, the power management state indications being states associated with a power management protocol used by the integrated circuit; and
   a thermal energy removal system configured to independently cool respective ones of the multiple regions responsive to the power management state indications, wherein in respond to a first and second of the power management state indications indicating a first of the regions is in a more active power management state than a second of the regions is in a more active power management state than a second of the regions, the thermal energy removal system is responsive to provide increased thermal energy removal capability for the first of the regions as compared to the second of the regions.

7. The apparatus as recited in claim 6 wherein the power management state indications are Advanced Configuration and Power Interface (ACPI) power states.

8. The apparatus as recited in claim 6 wherein the power management state indications do not include temperature, voltage, or frequency measurements.

9. The apparatus as recited in claim 6 wherein each of the plurality of sets of one or more output terminals include multiple groups of output terminals, each of the multiple groups of output terminals coupled to provide a respective one of the power management state indications.

10. The apparatus as recited in claim 6 wherein the multiple regions are processing cores of the integrated circuit.

11. The apparatus as recited in claim 6 further comprising a power management controller configured to interface with the thermal energy removal system, which includes a plurality energy removal device, by providing the power management state indications to the thermal energy removal system.

12. The apparatus as recited in claim 6 wherein the thermal energy removal system includes multiple fans configured to cool respective ones of the multiple regions by operating at speeds based on the power management state indications.

13. The apparatus as recited in claim 6 wherein the thermal energy removal system includes a liquid cooling system configured to provide cooling fluid flow to respective ones of the multiple regions based on the power management state indications.

14. The apparatus as recited in claim 13 further comprising a pump and multiple valves in fluid communication with the pump, the multiple valves operable to regulate the cooling fluid flow to respective ones of the multiple regions based on the power management state indications.

15. The apparatus as recited in claim 6 wherein the thermal energy removal system includes Peltier cooling devices.

16. A method comprising:
   receiving a first indication of a first power management state associated with operation of a first region of an integrated circuit;
   receiving a second indication of a second power management state associated with operation of a second region of the integrated circuit; and
   based on the first and second indications, allocating different respective first and second portions of a thermal cooling budget to the first and second regions;
   wherein the first and second power management state indication are states associated with the power management protocol used by the integrated circuit; and
   wherein the first and second power management state indications are received via one or more output terminal of the integrated circuit.

* * * * *

UNITED STATES PATENT AND TRADEMARK OFFICE
CERTIFICATE OF CORRECTION

PATENT NO. : 8,665,592 B2
APPLICATION NO. : 13/280864
DATED : March 4, 2014
INVENTOR(S) : Anthony C. Mowry et al.

Page 1 of 1

It is certified that error appears in the above-identified patent and that said Letters Patent is hereby corrected as shown below:

In the Claims

In column 7, line 24, please replace "respective" with --respectively--;

In column 7, line 58, please replace "respond" with --response--;

In column 8, line 24, please replace "device" with --devices--;

In column 8, line 52 and 53, please replace "indication" with --indications--;

In column 8, line 56, please replace "terminal" with --terminals--.

Signed and Sealed this
Ninth Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,665,592 B2 | Page 1 of 1 |
| APPLICATION NO. | : 13/280864 | |
| DATED | : March 4, 2014 | |
| INVENTOR(S) | : Anthony C. Mowry et al. | |

It is certified that error appears in the above-identified patent and that said Letters Patent is hereby corrected as shown below:

In the Claims

In column 8, lines 3 and 4, Claim 6 please remove "is in a more active power management state than a second of the regions";

In column 8, line 6, Claim 6 please remove "the".

Signed and Sealed this
Twentieth Day of January, 2015

Michelle K. Lee
*Deputy Director of the United States Patent and Trademark Office*